(12) United States Patent
Lakrout et al.

(10) Patent No.: US 9,944,063 B1
(45) Date of Patent: Apr. 17, 2018

(54) METHOD OF PRODUCING REINFORCED SUBSTRATE

(71) Applicant: Boral IP Holdings (Australia) Pty Limited, North Sydney (AU)

(72) Inventors: Hamed Lakrout, San Antonio, TX (US); Amitabha Kumar, San Antonio, TX (US); Li Ai, San Antonio, TX (US); Russell Hill, San Antonio, TX (US); Matthew Yatco Meneses, San Antonio, TX (US)

(73) Assignee: Boral IP Holdings (Australia) Pty Limited, North Sydney (AU)

( * ) Notice: Subject to any disclaimer, the term of this patent is extended or adjusted under 35 U.S.C. 154(b) by 0 days.

(21) Appl. No.: 15/161,921

(22) Filed: May 23, 2016

(51) Int. Cl.
*B32B 37/00* (2006.01)
*B32B 38/08* (2006.01)
*B32B 37/14* (2006.01)

(52) U.S. Cl.
CPC .............. *B32B 38/08* (2013.01); *B32B 37/14* (2013.01); *B32B 2305/38* (2013.01); *B32B 2307/50* (2013.01)

(58) Field of Classification Search
CPC ......... B32B 38/08; B32B 37/26; B32B 38/06; B32B 38/10; B32B 2305/38; B29C 70/443; B29C 65/54; B29C 65/542; B29C 65/546; B29C 65/548; B29C 65/70; B29C 70/021; B29C 70/026; B29C 70/086; B29C 59/02
USPC ......................... 156/39, 42, 43, 45, 247, 249
See application file for complete search history.

(56) References Cited

U.S. PATENT DOCUMENTS

| | | |
|---|---|---|
| 3,968,290 A | 7/1976 | Dees, Jr. et al. |
| 4,073,997 A | 2/1978 | Jones et al. |
| 4,094,829 A * | 6/1978 | Shearing ................ C08G 18/10 521/100 |
| 4,164,526 A | 8/1979 | Clay et al. |
| 4,204,019 A | 5/1980 | Parker et al. |
| 4,254,194 A | 3/1981 | Merrill et al. |
| 4,303,722 A * | 12/1981 | Pilgrim ................ B28B 19/003 156/39 |
| 4,459,334 A | 7/1984 | Odland Russell et al. |
| 4,661,533 A | 4/1987 | Stobby |
| 4,695,344 A * | 9/1987 | Crane ..................... B29C 70/44 156/242 |
| 4,797,314 A | 1/1989 | Davey et al. |
| 4,902,215 A * | 2/1990 | Seemann, III ........ B29C 43/203 156/382 |
| 4,940,629 A * | 7/1990 | Weber .................... C08J 9/0085 264/45.5 |
| 5,112,678 A | 5/1992 | Williams et al. |
| 5,204,033 A * | 4/1993 | Pearce ..................... B29B 11/16 156/174 |
| 5,891,563 A | 4/1999 | Letts et al. |
| 5,921,046 A * | 7/1999 | Hammond, Jr. .......... E04B 1/12 52/220.2 |
| 6,110,575 A | 8/2000 | Haga et al. |
| 6,159,410 A | 12/2000 | Haga et al. |
| 6,333,137 B1 | 12/2001 | Dickinson et al. |
| 6,995,098 B2 | 2/2006 | Robertson et al. |
| 7,645,490 B2 | 1/2010 | Dubose et al. |
| 7,867,927 B2 | 1/2011 | Dubose et al. |
| 7,989,370 B2 | 8/2011 | Currier et al. |
| 8,453,390 B2 | 6/2013 | Brandt et al. |
| 8,846,776 B2 | 9/2014 | Jian et al. |
| 2002/0151240 A1 | 10/2002 | Smith et al. |
| 2004/0266933 A1* | 12/2004 | Friedman ............. C08K 3/0008 524/442 |
| 2006/0125155 A1* | 6/2006 | Sekido .................. B29C 70/443 264/511 |
| 2007/0182071 A1* | 8/2007 | Sekido ................ B29C 33/0066 264/511 |
| 2011/0209812 A1* | 9/2011 | Bansal .................... B29C 70/44 156/87 |
| 2011/0262721 A1 | 10/2011 | Albertelli et al. |
| 2013/0133555 A1* | 5/2013 | Lloyd .................. C04B 28/006 106/695 |
| 2014/0349104 A1 | 11/2014 | Hill et al. |
| 2015/0079367 A1* | 3/2015 | Kim ....................... B32B 5/245 428/215 |
| 2016/0052168 A1 | 2/2016 | Li |
| 2016/0053078 A1 | 2/2016 | Ashish et al. |

FOREIGN PATENT DOCUMENTS

| | | | | |
|---|---|---|---|---|
| GB | 1116578 A * | 6/1968 | ............. | B28B 11/04 |
| WO | WO 03021096 A1 * | 3/2003 | .............. | B32B 5/18 |
| WO | 2009023170 A2 | 2/2009 | | |

* cited by examiner

*Primary Examiner* — John Goff

(57) ABSTRACT

Methods for producing building materials comprising a reinforced substrate are described herein. The method can include providing a substrate having a first surface and an opposed second surface, applying a fabric material to the first surface of the substrate, applying a hydrophobic polymeric woven mesh to the fabric material, applying a coating to the hydrophobic polymeric woven mesh thereby allowing the coating to penetrate the hydrophobic polymeric woven mesh and fabric material, removing the hydrophobic polymeric woven mesh, and curing the coating thereby bonding the fabric material to the first surface of the substrate. The substrate can include a polymeric material. In some embodiments, the substrate can include a polyurethane foam. The substrate can further include a filler. The hydrophobic polymeric woven mesh used in the building materials can be derived from alkylene monomers.

22 Claims, No Drawings

METHOD OF PRODUCING REINFORCED SUBSTRATE

FIELD OF THE DISCLOSURE

This disclosure relates generally to reinforced substrates, more particularly, to methods of producing the reinforced substrates.

BACKGROUND OF THE DISCLOSURE

Organic-inorganic composite materials have become desirable for a variety of uses because of their excellent mechanical properties and weathering stability. In general, the superior properties of organic-inorganic composites are achieved through the use of the organic material as a matrix material that acts as a glue with enhanced flexural properties or as a fibrous component providing reinforcement, improved tensile properties, and resistance to degradation from weathering of the composite when it is exposed to the environment. The inorganic material imparts various properties of rigidity, toughness, hardness, optical appearance and interaction with electromagnetic radiation, density, and many other physical and chemical attributes. Thus, organic-inorganic composite materials can be used in a variety of applications, such as in building materials. Nevertheless, there is a continuing desire to improve the properties and methods of producing composites.

SUMMARY OF THE DISCLOSURE

Methods for producing building materials comprising a reinforced substrate are described herein. The method can include providing a substrate having a first surface and an opposed second surface, applying a fabric material to the first surface of the substrate, applying a hydrophobic polymeric woven mesh to the fabric material, applying a coating to the hydrophobic polymeric woven mesh thereby allowing the coating to penetrate the hydrophobic polymeric woven mesh and fabric material, removing the hydrophobic polymeric woven mesh, and curing the coating thereby bonding the fabric material to the first surface of the substrate.

The substrate can include a polymeric material. Suitable polymeric materials can include plastics, resins, elastomers, thermoplastics, thermosets, and hot melts. In some embodiments, the substrate can include a polyurethane or a polyisocyanurate. In some embodiments, the substrate is a polyurethane foam. The polyurethane foam can include (a) a polyurethane formed by the reaction of (i) one or more isocyanates selected from the group consisting of diisocyanates, polyisocyanates, and mixtures thereof, and (ii) one or more polyols. The substrate can further include a filler. The filler can include an inorganic filler such as an inorganic particulate filler. In some embodiments, the inorganic particulate filler comprises coal ash such as fly ash. The filler can further include a plurality of fibers. The amount of filler in the substrate can be 50% or greater by weight, based on the total weight of the substrate. For example, the filler can be present in an amount from 50% to 90% or from 60% to 85% by weight, based on the total weight of the substrate. The substrate used in the building materials can have a density of from 5 lb/ft$^3$ to 70 lb/ft$^3$. In some embodiments, the density of the substrate can be from 5 lb/ft$^3$ to 35 lb/ft$^3$, from 10 lb/ft$^3$ to 35 lb/ft$^3$, from 15 lb/ft$^3$ to 35 lb/ft$^3$, or from 15 lb/ft$^3$ to 25 lb/ft$^3$.

The fabric material used in the building materials can be formed from a woven or nonwoven fabric. The woven or nonwoven fabric material can be derived from an organic material, an inorganic material, or a combination thereof. In some embodiments, the fabric material can include a fiber mat comprising glass fibers, polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, metal and metal-coated fibers, mineral fibers, or combinations thereof. In certain embodiments, the fabric material can be derived from a material that can resist corrosion, for example due to the coating. In certain embodiments, the fabric material can include inorganic fibers. In some examples, the fabric material includes glass fibers. Exemplary fabric materials for use in the building materials include a glass veil or a glass scrim. The fibers (when used) in the fabric material can have a diameter of from 1 to 100 microns. The fabric material can have a basis weight of 50 g/ft$^2$ or less, e.g., from 0.5 g/ft$^2$ to 50 g/ft$^2$, from 0.5 g/ft$^2$ to 20 g/ft$^2$, or from 0.5 g/ft$^2$ to 10 g/ft$^2$. In some embodiments, the thickness of the fabric material can be 0.001 inch or greater, e.g., from 0.001 inch to 0.1 inch.

The hydrophobic polymeric woven mesh used in the building materials can be derived from alkylene monomers. In some examples, the hydrophobic polymeric woven mesh comprises a polyethylene woven mesh. In the methods for making the building materials described herein, the hydrophobic polymeric woven mesh and the fabric material can be affixed to the substrate prior to applying the coating.

In some embodiments, the coating used in the building materials can include a polymeric material. In some embodiments, the coating can include a cementitious material. Cementitious materials useful in the coatings can include a rapid set cement. Examples of suitable rapid set cements include calcium aluminate cement (CAC), calcium phosphate cement, calcium sulfate hydrate, calcium sulfoaluminate (CSA) cement, magnesium oxychloride cement, magnesium oxysulfate cement, magnesium phosphate cement, or combinations thereof. In some embodiments, the cementitious material includes Portland cement. In some embodiments, the cementitious material can further include fly ash, slag, sand, or combinations thereof. In these examples, the amount of fly ash, slag, sand, or combination thereof, present in the cementitious material can be 30% or less by weight, based on the total weight of the cementitious material.

In some embodiments, the cementitious material can be derived from an inorganic polymer formed by reacting in the presence of water: a reactive powder comprising fly ash and an activator. The fly ash can be present in an amount of 85% or greater by weight, based on the total weight of the reactive powder. The reactive powder can further include a rapid set cement and/or Portland cement as described herein. In some embodiments, the reactive powder consists of fly ash. The cementitious material can further include a photocatalyst, such as titanium dioxide.

The cementitious material (when used) can be applied at a suitable pH to slow or prevent corrosion of the fabric material. In the methods for making the building materials described herein, the method can include applying a liquid to the cementitious coating to activate the cementitious material. The pH of the liquid can be 5 or greater and the liquid optionally comprises an activator. The method can further include allowing the filler in the substrate to react with the cementitious material to form a chemical bond between the cementitious material and the substrate. In some embodiments, the substrate can comprise a foam structure which mechanically bonds with the coating such as the cementitious material upon hardening. In some embodiments, the substrate can include a particulate inorganic filler such as fly ash that will react with the cementitious material to form a chemical bond between the cementitious material and the substrate.

The coating used in the building materials described herein can be applied at a viscosity of from 25 to 5000 cPs at 25° C. The coating can be non-self-leveling. In certain embodiments, the coating can be applied by roller coating, curtain coating, dip coating, brushing, with a trowel, or spraying. The average thickness of the coating after curing, can be from 0.005 inch to 0.25 inch.

The method for making the building materials can further include applying a facing material to the second surface of the substrate. In some embodiments, the method can include applying a fabric material to the second surface of the substrate, applying a hydrophobic polymeric woven mesh to the fabric material, applying a coating to the hydrophobic polymeric woven mesh thereby allowing the coating to penetrate the hydrophobic polymeric woven mesh and fabric material, removing the hydrophobic polymeric woven mesh, and curing the coating thereby bonding the fabric material to the second surface of the substrate. In some embodiments, the method can include applying an adhesive to the second surface of the substrate and applying a facing material to the adhesive thereby bonding the material to the second surface of the substrate. The facing material can be selected from a paper sheet, a metal sheet, a polymeric layer, and a combination thereof. The adhesive can be applied to the second surface of the substrate by spray coating, curtain coating, brushing, roller coating, dip coating, spin coating, or flow coating.

In some embodiments, a moisture-retaining material can be contacted with the coating adjacent the first surface to retain moisture in the coating adjacent the first surface while the coating adjacent the second surface is applied. For example, a moisture-retaining material can be applied to the coating prior to reversing the reinforced substrate to apply materials to the second opposed surface of the substrate. Alternatively, the reinforced substrate can be reversed and the coating adjacent the first surface can be placed adjacent the moisture-retaining material. The moisture-retaining material can be a plastic material, a paper material, or a plywood sheet.

Building materials prepared from the methods described herein are also disclosed. In some embodiments, the building material can be a tile backer, sheathing, roofing product, or cladding.

DETAILED DESCRIPTION

Building materials and methods of preparing the building materials are described herein. The building materials can include a substrate comprising a fabric material in contact with a first surface of the substrate and a coating material adjacent the fabric material opposite the substrate.

The substrate can comprise a polymeric material. The polymer in the substrate can include plastics, resins, elastomers, thermoplastics, thermosets, and hot melts. Polymers suitable for use in the substrate include polyolefins (e.g., polyethylene or polypropylene), ethylene copolymers, polystyrenes, polyvinyl chlorides, polyvinylidene chlorides, polyvinyl acetates, polyacrylonitriles, polyamides (e.g., nylon), polyisobutylenes, polyacetals, chlorinated and fluorinated polymers (e.g., PTFE), fluoroelastomers, fluorosilicones, polycarbonates, epoxies, phenolics, polyesters, acrylic polymers, acrylate polymers, polyureas, polyisocyanurates, polyurethanes, alkyds, silicones, styrene-butadiene (SB) copolymers, acrylonitrile-butadiene-styrene (ABS)copolymers, nitrile rubbers, diallyl phthalates, melamines, polybutadienes, cellulosics, cellulose acetobutyrates, ionomers, parylenes, polyaryl ethers, polyaryl sulfones, polyarylene sulfides, polyethersulfones, polyallomers, polyimides, polyamideimides, polymethylpentenes, polyphenylene oxides, polyphenylene sulfides, polysulfones, polyetherketones, polyetherimides, polyaryleneketones, polychloroprenes, combinations thereof, or blends thereof. In some embodiments, the polymer can include polyethylene, polypropylene, polyvinyl chloride, nylon, epoxy, phenolic, polyester, acrylic polymer, acrylate polymer, polyurethane, styrene butadiene copolymer, acrylonitrile-butadiene-styrene copolymer, a combination thereof, or a blend thereof.

In some examples, the polymer in the substrate can include a polyisocyanurate or a polyurethane. In some examples, the substrate is a polyisocyanurate or polyurethane foam. The polyurethane foam can be formed by a reaction of (i) one or more isocyanates selected from the group consisting of diisocyanates, polyisocyanates, and mixtures thereof, and (ii) one or more polyols.

Isocyanates suitable for use in the substrates described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. The particular isocyanate used in the substrate can be selected based on the desired viscosity of the mixture used to form the substrate. An initial low viscosity is desirable for ease of handling. Other factors that influence the particular isocyanate can include the overall properties of the foam, such as the amount of foaming, strength of bonding to the filler, wetting of the inorganic particulates in the reaction mixture, strength of the resulting foam, stiffness (elastic modulus), and reactivity. Suitable isocyanate compositions for forming the foam include those having viscosities ranging from 25 to 700 cPs at 25° C.

An example of a useful diisocyanate is methylene diphenyl diisocyanate (MDI). Useful MDI's include MDI monomers, MDI oligomers, and mixtures thereof. Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, $2^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the substrates described herein can be from 1.5 to 5. Further, examples of useful isocyanates include isocyanates with an average functionality of 2 to 4.5, 2.2 to 4, 2.4 to 3.7, 2.6 to 3.4, and 2.8 to 3.2.

As indicated herein, the polyurethane foam includes one or more polyols. It is generally desirable to use polyols in liquid form, and generally in low viscosity liquid form available, as these can be more easily mixed. Suitable polyol compositions for forming the polyurethane include those having viscosities of 5000 cPs or less at 25° C. In certain embodiments, the polyol composition can include those having viscosities of 4500 cPs or less, 4000 cPs or less, 3500 cPs or less, 3000 cPs or less, 2500 cPs or less, or 2000 cPs or less at 25° C. In certain embodiments, the polyol composition can include those having viscosities of 150 cPs or greater, 250 cPs or greater, 500 cPs or greater, 750 cPs or greater, 1000 cPs or greater, or 1500 cPs or greater. In certain embodiments, the polyol composition can include those having viscosities of from 150 to 5000 cPs or from 150 to 2500 cPs at 25° C. In some embodiments, a blend of the one or more polyols and the one or more isocyanates used in the substrate can have a viscosity of from 100 to 6000 cPs, from 100 to 2500 cPs, from 100 to 1400 cPs, from 100 to 1200 cPs or from 100 to 1000 cPs at 25° C.

The one or more polyols for use in the polyurethane foam can include polyester polyols, polyether polyols, Mannich polyols, or combinations thereof. The choice and amounts of polyol, especially the number of reactive hydroxyl groups per polyol, the functionality, and the size and flexibility of its molecular structure, may control the mechanical and physical properties of the foam formed.

The one or more polyols can have an average equivalent weight of 150 g/eq or greater (e.g., 175 g/eq or greater, 200 g/eq or greater, 210 g/eq or greater, 220 g/eq or greater, 225 g/eq or greater, or 230 g/eq or greater). In some cases, the one or more polyols have an average equivalent weight of 700 g/eq or less (e.g., 550 g/eq or less, 500 g/eq or less, 450 g/eq or less, 400 g/eq or less, 350 g/eq or less, 300 g/eq or less, 275 g/eq or less, 250 g/eq or less, or 235 g/eq or less). In some cases, the one or more polyols have an average equivalent weight of from 150 g/eq to 700 g/eq, from 175 g/eq to 700 g/eq, from 200 g/eq to 700 g/eq, from 150 g/eq to 500 g/eq, from 150 g/eq to 400 g/eq, or from 150 g/eq to 300 g/eq. In some embodiments, the one or more polyols do not include any polyols having an equivalent weight of 750 g/eq or greater.

In some embodiments, the one or more polyols in the composite can include a less reactive polyol. The less reactive polyol can have lower numbers of primary hydroxyl groups, lower primary hydroxyl numbers, higher numbers of secondary hydroxyl groups, and higher cream times and tack-free times in a composite mixture, than a highly reactive polyol. In some embodiments, the one or more polyols can be capped with an alkylene oxide group, such as ethylene oxide, propylene oxide, butylene oxide, and combinations thereof, to provide the polyols with the desired reactivity. In some examples, the one or more polyols can include a poly(propylene oxide) polyol which contain terminal secondary hydroxyl groups and are end-capped with ethylene oxide to provide polyols with primary hydroxyl groups.

In some embodiments, the one or more polyols have about 40% or less primary hydroxyl groups, about 35% or less primary hydroxyl groups, about 30% or less primary hydroxyl groups, about 25% or less primary hydroxyl groups, about 20% or less primary hydroxyl groups, about 15% or less primary hydroxyl groups, or even about 10% or less primary hydroxyl groups. The one or more polyols can have primary hydroxyl numbers (as measured in units of mg KOH/g) of less than about 220, less than about 200, less than about 180, less than about 160, less than about 140, less than about 120, less than about 100, less than about 80, less than about 60, less than about 40, or even less than about 20. The number of primary hydroxyl groups can be determined using fluorine NMR spectroscopy as described in ASTM D4273.

The one or more polyols can have hydroxyl numbers (as measured in units of mg KOH/g) of 1000 or less, 900 or less, 800 or less, 700 or less, 650 or less, 600 or less, 550 or less, 500 or less, 450 or less, 400 or less, 350 or less, 300 or less, 250 or less, 200 or less, or 150 or less. The one or more polyols can have hydroxyl numbers (as measured in units of mg KOH/g) of 50 or more, 100 or more, 150 or more, 200 or more, 250 or more, 300 or more, 350 or more, 400 or more, 450 or more, or 500 or more. In some embodiments, the average hydroxyl number is 700 or less, 650 or less, 600 or less, 550 or less, 500 or less, 450 or less, 400 or less, 350 or less, 300 or less, or 250 or less, and/or is 100 or more, 150 or more, 200 or more, 250 or more, 300 or more, 350 or more, 400 or more, 450 or more, or 500 or more. For example, the average hydroxyl number can be from 100-700, 100-500, 150-450, or 200-400. In some embodiments, the one or more polyols include two or more polyols. For example, there can be a blend of 75% of a polyol having a hydroxyl number of 400 and 25% of a polyol having a hydroxyl number of 100 to produce an average hydroxyl number of 325.

The composite can include one or more polyols that can provide a delay in the cream time and tack free time of the polyurethane mixture during foaming. For example, the composite can include polyols containing glycerine and/or amine groups which can delay the cream time and/or tack free time of the polyurethane mixture. In some embodiments, the one or more polyols can increase the cream time of the polyurethane mixture to 40 seconds or greater such as from 40 seconds to 120 seconds. In some embodiments, the one or more polyols can increase the tack-free time of the polyurethane mixture to 90 seconds or greater such as from 90 seconds to 7 minutes.

The one or more polyols can include amine groups, such as primary amine groups, secondary amine groups, tertiary amine groups, or combinations thereof. In some embodiments, the total amine value (i.e., a measure of the concentration of tertiary, secondary, and primary amine groups as measured in units of mg KOH/g) of 50 or less, 45 or less, 40 or less, 35 or less, 30 or less, 25 or less, 20 or less, 15 or less, 10 or less, or 5 or less. The one or more polyols can have a total amine value (as measured in units of mg KOH/g) of from 0 to 50, from greater than 0 to 50, or from greater than 0 to 45. In some embodiments, the one or more polyols can have a total amine value (as measured in units of mg KOH/g) of about 50.

The functionality of the one or more polyols useful with the foam described herein can be 7 or less, 6.5 or less, 6 or less, 5.5 or less, 5 or less, 4.5 or less, 4 or less, 3.5 or less, 3.25 or less, 3 or less, 2.75 or less, 2.5 or less, or 2.25 or less.

In some embodiments, the functionality of the one or more polyols can be 2 or greater, 2.25 or greater, 2.5 or greater, 2.75 or greater, 3 or greater, 3.25 or greater, 3.5 or greater, 3.75 or greater, or 4 or greater. The average functionality of the one or more polyols useful with the foam described herein can be 5.5 or less, for example, 5 or less, 4.5 or less, 4 or less, 3.5 or less, 3.25 or less, 3 or less, 2.75 or less, 2.5 or less, or 2.25 or less. In some embodiments, the average functionality of the one or more first polyols can be 2 or greater, 2.25 or greater, 2.5 or greater, 2.75 or greater, 3 or greater, 3.25 or greater, 3.5 or greater, 3.75 or greater, or 4 or greater. Further, examples of useful first polyols include polyols with an average functionality of from 2.5 to 5.5, from 3 to 5.5, from 3 to 5, from 3 to 4.5, from 2.5 to 4, from 2.5 to 3.5, or from 3 to 4.

The one or more polyols can have an average molecular weight of 250 g/mol or greater (e.g., 300 g/mol or greater, 350 g/mol or greater, 400 g/mol or greater, 450 g/mol or greater, 500 g/mol or greater, 550 g/mol or greater, 600 g/mol or greater, 650 g/mol or greater, 700 g/mol or greater, 750 g/mol or greater, 800 g/mol or greater, 900 g/mol or greater, 1000 g/mol or greater, 1200 g/mol or greater, or 1400 g/mol or greater). In some cases, the one or more polyols have an average molecular weight of 1500 g/mol or less (e.g., 1400 g/mol or less, 1300 g/mol or less, 1200 g/mol or less, 1100 g/mol or less, 1000 g/mol or less, 900 g/mol or less, 800 g/mol or less, 750 g/mol or less, 700 g/mol or less, 650 g/mol or less, 600 g/mol or less, 550 g/mol or less, 500 g/mol or less, 450 g/mol or less, 400 g/mol or less, or 300 g/mol or less). In some cases, the one or more polyols have an average molecular weight of from 250 g/mol to 1500 g/mol, from 250 g/mol to 1000 g/mol, or from 500 g/mol to 1000 g/mol. In some embodiments, the one or more polyols do not include any polyols having a molecular weight of 1000 g/mol or greater.

The one or more polyols can include polyester polyols, polyether polyols, or combinations thereof. Suitable polyols include polyether polyols such as those sold under the Carpol® trademark or under the Jeffol® trademark. In some examples, the polyether polyol can include a glycerin-based polyol and derivatives thereof commercially available from Carpenter Co. (e.g., Carpol® GP-240; Carpol® GP-725; Carpol® GP-700; Carpol® GP-1000; Carpol® GP-1500;). In some examples, the polyether polyol can include a polypropylene-based polyol and derivatives thereof commercially available from Huntsman International (e.g., Jeffol® FX31-240; Jeffol® G30-650; Jeffol® FX31-167; Jeffol® A-630; Jeffol® AD-310). Suitable polyols include polyester polyols available from Huntsman International (e.g., XO 13001). In some embodiments, the polyols can include a sucrose and/or amine-based polyol. The sucrose and/or amine-based polyol can include, for example, a polyether polyol (including for example ethylene oxide, propylene oxide, butylene oxide, and combinations thereof) which is initiated by a sucrose and/or amine group. Sucrose and/or amine-based polyols are known in the art, and include, for example, sucrose/amine initiated polyether polyol sold under the trade name CARPOL® SPA-357 or CARPOL® SPA-530 (Carpenter Co., Richmond, Va.) and triethanol amine initiated polyether polyol sold under the trade name CARPOL® TEAP-265 (Carpenter Co., Richmond, Va.).

The composite can include one or more additional polyols. In some examples, the one or more additional polyols include aromatic polyols such as aromatic polyester polyols, aromatic polyether polyols, or combinations thereof, such as those sold under the TEROL® trademark (e.g., TEROL® 198 and TEROL® 250). The aromatic polyol can have an aromaticity of 35% or greater, such as 38% or greater, 40% or greater, 45% or greater, 50% or greater, or 55% or greater and/or an aromaticity of 80% or less, 75% or less, 70% or less, 65% or less, 60% or less, 55% or less, 50% or less, 45% or less, 50% or less, 45% or less, or 40% or less.

In some embodiments, the one or more additional polyols can include polyols having a large number of primary hydroxyl groups (e.g. 75% or more) based on the total number of hydroxyl groups in the polyol. For example, the high primary hydroxyl group polyols can include 80% or more, 85% or more, 90% or more, 95% or more, or 100% of primary hydroxyl groups.

In some embodiments, the one or more additional polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the reaction mixture can include one or more additional isocyanate-reactive monomers such as one or more polyamines. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the reaction mixture can include an alkoxylated polyamine (i.e., alkylene oxide-capped polyamines) derived from a polyamine and an alkylene oxide. Alkoxylated polyamines can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof. Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the one or more polyols used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyols.

As indicated herein, in the polyurethane foams, one or more isocyanates are reacted with the one or more polyols (and any additional isocyanate-reactive monomers) to produce the polyurethane formulation. In general, the ratio of isocyanate groups to the total isocyanate reactive groups, such as hydroxyl groups, water and amine groups, is in the range of 0.5:1 to 1.5:1, which when multiplied by 100 produces an isocyanate index between 50 and 150. Additionally, the isocyanate index can be from 80 to 120, from 90 to 120, from 100 to 115, or from 105 to 110. In some embodiments, a polyisocyanurate foam can be produced by reacting the one or more isocyanates with the one or more polyols (and any additional isocyanate-reactive monomers). In general, the isocyanate index for the polyisocyanurate formulation can be from 180 to 380. For example, the isocyanate index can be from 180 to 350, from 200 to 350, or from 200 to 270. As used herein, an isocyanate may be selected to provide a reduced isocyanate index, which can be reduced without compromising the chemical or mechanical properties of the foam.

One or more catalysts can be added to facilitate curing and can be used to control the curing time of the polyurethane matrix. Examples of useful catalysts include amine-containing catalysts (for example diethanolamine and tertiary amines such as DABCO and tetramethylbutanediamine), carboxylic acid salts-, tin-, mercury-, and bismuth-containing catalysts. In some embodiments, the catalyst includes a delayed-action tin catalyst. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane. In some embodiments, 0.05 to 0.5 parts catalyst or catalyst system per hundred parts of polyol can be used.

The polymer can be present in the substrate in an amount from 10% to 100% based on the weight of the substrates. In some embodiments, the polymer does not include a filler. In some embodiments, the polymer is filled and the polymer can be included in an amount from 14% to 55% or 20% to 50% by weight, based on the weight of the substrate. In some embodiments, the polymer in the substrate can be present in an amount of 10% or greater, 15% or greater, 20% or greater, 25% or greater, 30% or greater, 35% or greater, 40% or greater, 45% or greater, 50% or greater, or 55% or greater by weight, based on the weight of the substrate. In some embodiments, the polymer in the substrate can be present in an amount of 60% or less, 55% or less, 50% or less, 45% or less, 40% or less, 35% or less, 30% or less, 25% or less, 20% or less, or 15% or less by weight, based on the weight of substrate.

As described herein, the substrate in the building materials can include a filler. The filler can include an inorganic filler. The filler can be present in the substrate described herein in amounts from 50% to 90% by weight of the substrate. In some embodiments, the filler, for example inorganic filler, can be present in amounts from 50% to 80% by weight such as from 55% to 80% by weight or from 60% to 75% by weight. The filler can be described by its aspect ratio. In some embodiments, the filler in the substrate can have an average aspect ratio of length to diameter of from 1:1 to 10,000:1. For example, the filler can have an average aspect ratio of from 1:1 to 9000:1, 1:1 to 8000:1, 1:1 to 7000:1, 1:1 to 6000:1, 1:1 to 5000:1, 1:1 to 4000:1, 1:1 to 3000:1, 1:1 to 2000:1, 1:1 to 1000:1, 1:1 to 700:1, 1:1 to 500:1, 1:1 to 250:1, 1.05:1 to 400:1, 1.1:1 to 300:1, 1.15:1 to 250:1, or 1.2:1 to 200:1. In some embodiments, the filler can have an average aspect ratio of length to diameter of 200:1 or less, 150:1 or less, 100:1 or less, 75:1 or less, 50:1 or less, 40:1 or less, 30:1 or less, 20:1 or less, 10:1 or less, or 5:1 or less, and from 1:1 or more (e.g., 1.05:1 or more, 1.1:1 or more, 1.15:1 or more, or 1.2:1 or more).

The filler can include a particulate filler and particularly an inorganic particulate filler. Suitable examples of particulate fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; and mixtures thereof. The particulate filler can have a median particle size diameter of from 0.2 micron to 100 microns.

In some embodiments, the particulate filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the particulate filler includes fly ash. Fly ash is produced from the combustion of pulverized coal in electrical power generating plants. The fly ash useful with the substrates described herein can be Class C fly ash, Class F fly ash, or a mixture thereof. Fly ash produced by coal-fueled power plants is suitable for incorporation in the substrates described herein. In some embodiments, the particulate filler consists of or consists essentially of fly ash. The fly ash can have a particle size distribution with at least two modes. For example, the particle size distribution of the fly ash can be three, four, five, or more modes. Alternatively, the fly ash can be blended with another fly ash to modify the properties of the fly ash to produce a fly ash having a particle size distribution with at least three modes.

In some embodiments, the fly ash can include a first mode having a median particle diameter of 2.0 microns or less. In some examples, the median particle size of the first mode can be 0.3 microns to 1.5 microns, 0.4 microns to 1 microns, or 0.5 microns to 0.8 microns (e.g., 0.7 microns). The fly ash can include a second mode having a median particle diameter of from 3 microns to less than 40 microns. In some examples, the median particle size of the second mode can be from 5 microns to 35 microns, 10 microns to 30 microns, or 10 microns to 25 microns. The fly ash can include a third mode having a median particle diameter of 40 microns or greater. In some examples, the median particle size of the third mode can be from 40 microns to less than 100 microns, for example from 40 microns to 90 microns, 40 microns to 80 microns, or from 40 microns to 75 microns. In some embodiments, the fly ash can include a first mode having a median particle diameter of from 0.3 microns to 1.0 micron, a second mode having a median particle diameter of from 10 microns to 25 microns, and a third mode having a median particle diameter of from 40 microns to 80 microns. In some examples, the fly ash can also include an additional ultrafine mode with a median particle diameter of from 0.05 microns to 0.2 microns.

In some embodiments, the particle size distribution can include 11-35% of the particles by volume in the first mode, 65-89% of the particles by volume in the second mode. In some embodiments, the particle size distribution can include 11-17% of the particles by volume in the first mode, 56-74% of the particles by volume in the second mode, and 12-31% of the particles by volume in the third mode. The ratio of the volume of particles in the second mode to the volume of particles in the first mode can be from 4.5 to 7.5.

The particulate filler can be present in the substrate described herein in amounts from 35% to 90% by weight. Examples of the amount of particulate filler present in the substrate described herein include 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In some embodiments, the particulate filler, for example fly ash, can be present in amounts from 50% to 80% by weight such as from 55% to 80% by weight or from 60% to 75% by weight.

In some embodiments, the particulate filler can include fly ash and calcium carbonate. When used with fly ash, the amount of calcium carbonate in the substrate can be from 0.1% to 15% by weight, based on the weight of the substrate. In some embodiments, the substrate can include 15% or less, 14% or less, 12% or less, 10% or less, or 8% or less by weight calcium carbonate. In some embodiments, the substrate can include 0.1% or greater, 0.5% or greater, 1% or greater, 2% or greater, 3% or greater, or 5% or greater by weight calcium carbonate. In some embodiments, when used with fly ash, the substrate can include 1% to 15%, 1% to 10%, or 1% to 8% by weight calcium carbonate.

In some embodiments, the particulate filler can include sand. In certain embodiments, the particulate filler can include fly ash and sand. In certain embodiments, the particulate filler can include fly ash, sand, and calcium carbonate. The amount of sand in the substrate can be from 0.1% to 15% by weight, based on the weight of the substrate. In some embodiments, the substrate can include 15% or less, 14% or less, 12% or less, 10% or less, or 8% or less by weight sand. In some embodiments, the substrate can include 0.1% or greater, 0.5% or greater, 1% or greater, 2% or greater, 3% or greater, or 5% or greater by weight sand. In some embodiments, the substrate can include 1% to 15%, 1% to 10%, or 1% to 8% by weight sand.

In some embodiments, the particulate filler can include an organic filler, such as a recycled polymeric material. Suitable examples include pulverized polymeric foam or recycled rubber material.

The filler can include a plurality of fibers. The fibers can be any natural or synthetic fiber, based on inorganic or organic materials. Inorganic and organic fibers suitable for use with the substrate can include glass fibers, basalt fibers, alumina silica fibers, aluminum oxide fibers, silica fibers, carbon fibers, metal fibers, metal and metal-coated fibers, mineral fibers (such as stone wool, slag wool, or ceramic fiber wool), polyalkylene fibers, polyester fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, or combinations thereof. In certain embodiments, the fiber material can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable fibers include synthetic fibers such as, Kevlar, viscose fibers, Dralon® fibers, polyethylene fibers, polyethylene terephthalate fibers, polyethylene naphthalate fibers, polypropylene fibers, polyvinyl alcohol fibers, aramid fibers, or combinations thereof. In some embodiments, the fiber material can include glass fibers. Glass fibers can include fibrous glass such as E-glass, C-glass, S-glass, and AR-glass fibers. In some examples, fire resistant or retardant glass fibers can be included to impart fire resistance or retarding properties to the substrate. In some embodiments, the substrate can include a combination of fibers that break and fibers that do not break when the substrate is being formed using processing machinery and/or fractured by external stress.

In some embodiments, the fibers can be dispersed within the substrate. The fibers in the substrate can be present in the form of individual fibers, chopped fibers, bundles, strings such as yarns, fabrics, papers, rovings, mats, or tows. In some embodiments, the substrate can include a plurality of glass fibers. The average length of the glass fibers in the substrate can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the substrate can have any dimension of from 1 μm to 30 μm in average diameter. For example, the average diameter of the glass fibers can be 1.5 μm to 30 μm, 3 μm to 20 μm, 4 μm to 18 μm, or 5 μm to 15 μm in average diameter. The glass fibers can be provided in provided in the substrate in a random orientation or can be axially oriented.

The fibers can also be described by its aspect ratio. In some embodiments, the fibers in the substrate can have an average aspect ratio of length to diameter of from 8:1 to 2000:1. For example, the fibers can have an average aspect ratio of from 8:1 to 1500:1, 8:1 to 1000:1, 8:1 to 700:1, 5:1 to 2000:1, 5:1 to 1500:1, 5:1 to 1000:1, 5:1 to 750:1, 1.5:1 to 500:1, 1.5:1 to 400:1, 1.5:1 to 300:1, 1.5:1 to 250:1, 2:1 to 200:1, 2.5:1 to 150:1, 3:1 to 100:1, 3.5:1 to 75:1, 4:1 to 50:1, 5:1 to 25:1, 5:1 to 20:1, or 5:1 to 10:1. In some embodiments, the fibers can have an average aspect ratio of length to diameter of 1.5:1 or greater, 2:1 or greater, 3:1 or greater, 4:1 or greater, 5:1 or greater, 7.5:1 or greater, 10:1 or greater, 15:1 or greater, 20:1 or greater, 25:1 or greater, 30:1 or greater, or 40:1 or greater. In some embodiments, the fiber can have an average aspect ratio of length to diameter of 200:1 or less, 150:1 or less, 100:1 or less, 75:1 or less, 50:1 or less, 40:1 or less, 30:1 or less, 20:1 or less, 10:1 or less, or 5:1 or less.

The fibers (when used) can be present in the substrate in amounts of 15% or less by weight, based on the weight of substrate. For example, the fibers can be present in amounts from 0.25% to 15%, 0.5% to 15%, 1% to 15%, 0.25% to 10%, 0.5% to 10%, 1% to 10%, 0.25% to 8%, 0.25% to 6%, or 0.25% to 4% by weight, based on the weight of the substrate. In some embodiments, the substrate is free of fibers dispersed within the substrate.

The substrate described herein can comprise additional materials. The additional materials useful with the substrate can include foaming agents, blowing agents, surfactants, chain-extenders, crosslinkers, coupling agents, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. In the case of polyurethane foam, water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the foam in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the foam includes less than 0.5% by weight water. In some embodiments, no chemical foaming agents are used. In some embodiments, water is the only foaming agent used.

Surfactants can be used as wetting agents and to assist in mixing and dispersing the materials in a substrate. When the substrate includes a polyurethane foam, surfactants can also stabilize and control the size of bubbles formed during the foaming event and the resultant cell structure. Surfactants can be used, for example, in amounts below about 0.5 wt % based on the total weight of the mixture. Examples of surfactants useful with the substrates described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the substrate described herein. These reactants can help the components of the substrate to distribute the filler within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In the polyurethane containing substrates, a crosslinker or chain-extender may be used to replace at least a portion of the one or more polyols in the substrate. For example, the polyurethane can be formed by the reaction of an isocyanate, a polyol, and a crosslinker.

Coupling agents and other surface treatments such as viscosity reducers, flow control agents, or dispersing agents can be added directly to the filler, or incorporated prior to, during, and/or after the mixing and reaction of the substrate. Coupling agents may also reduce the viscosity of the substrate mixture. Coupling agents can also allow higher filler loadings of for example, the particulate filler such as fly ash, and/or fiber material, and may be used in small quantities. For example, the substrate may comprise about 0.01 wt % to about 0.5 wt % of a coupling agent. Examples of coupling agents useful with the substrate described herein include Ken-React LICA 38 and KEN-React KR 55 (Kenrich Petrochemicals; Bayonne, N.J.). Examples of dispersing agents useful with the substrate described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the substrate described herein. Examples of UV light stabilizers include hindered amine type stabilizers and opaque pigments like carbon black powder. Fire retardants can be included to increase the flame or fire resistance of the substrate. Antimicrobials can be used to limit the growth of mildew and other organisms on the surface of the substrate. Antioxidants, such as phenolic antioxidants, can also be added. Antioxidants provide increased UV protection, as well as thermal oxidation protection.

Pigments or dyes can optionally be added to the substrate described herein. An example of a pigment is iron oxide, which can be added in amounts ranging from about 2 wt % to about 7 wt %, based on the total weight of the substrate.

The substrate can comprise a high filler loading, such as from 50% to 90% by weight of the substrate, which can result in an increase in the density of the substrate. In some embodiments, it is desirable that the substrate has a density below a particular threshold at the desired loadings so it remains relatively lightweight and/or can be effectively processed. In some embodiments, the amount of filler can be present in the substrate mixture in amounts to produce a substrate having a density 2 $lb/ft^3$ to 75 $lb/ft^3$. In some embodiments, the density is at least 5 $lb/ft^3$ and/or 35 $lb/ft^3$ or less. For example, the density of the substrate can be 5 $lb/ft^3$ to 35 $lb/ft^3$, 10 $lb/ft^3$ to 35 $lb/ft^3$, 15 $lb/ft^3$ to 35 $lb/ft^3$, 15 $lb/ft^3$ to 25 $lb/ft^3$, 10 $lb/ft^3$ to 30 $lb/ft^3$, 10 $lb/ft^3$ to 25 $lb/ft^3$, or 20 $lb/ft^3$ to 30 $lb/ft^3$. In some embodiments, the density of the substrate can be 5 $lb/ft^3$ to 75 $lb/ft^3$, 5 $lb/ft^3$ to 70 $lb/ft^3$, 5 $lb/ft^3$ to 60 $lb/ft^3$, 35 $lb/ft^3$ to 75 $lb/ft^3$, 35 $lb/ft^3$ to 70 $lb/ft^3$, 35 $lb/ft^3$ to 60 $lb/ft^3$.

The flexural strength of the substrate described herein can be 100 psi or greater (e.g., up to 1000 psi). For example, the flexural strength of the substrate can be 200 psi or greater, 300 psi or greater, 400 psi or greater, 500 psi or greater, 600 psi or greater, 700 psi or greater, or 1000 psi or greater. In some embodiments, the flexural strength of the substrate can be from 100 to 700 psi. The flexural strength can be determined by the load required to fracture a rectangular prism loaded in the three point bend test as described in ASTM C1185-08 (2012). The substrate can exhibit a ratio of flexural strength (in psi) to density (in $lb/ft^3$) of from 10:1 to 200:1. In some embodiments, the substrate can exhibit a ratio of flexural strength (in psi) to density (in $lb/ft^3$) of from 10:1 to 100:1 or from 20:1 to 100:1.

The modulus of elasticity (stiffness) of the substrate can be 10 ksi or greater, 15 ksi or greater, 20 ksi or greater, 25 ksi or greater, or 30 ksi or greater. For example, the modulus of elasticity can be from 15 to 30 ksi, from 20 to 30 ksi, or from 22 to 28 ksi. The modulus of elasticity can be determined as described in ASTM C947-03. The substrate can exhibit a ratio of modulus of elasticity (in ksi) to density (in $lb/ft^3$) of from 1:2 to 2:1. In some embodiments, the substrate can exhibit a ratio of modulus of elasticity (in ksi) to density (in $lb/ft^3$) of 1:1.5 to 1.5:1 or from 1:1.2 to 1.2:1.

The compressive strength of the substrate can be 100 psi or greater. For example, the compressive strength can be from 100 to 300 psi, from 150 to 250 psi or from 175 to 240 psi. The compressive strength can be determined as described in ASTM D1621. The substrate can exhibit a ratio of compressive strength (in psi) to density (in $lb/ft^3$) of from 7:1 to 25:1. In some embodiments, the substrate can exhibit a ratio of compressive strength (in psi) to density (in $lb/ft^3$) of from 8:1 to 15:1.

The foam can have a thickness of from 0.1 inch to 6 inches. For example, the foam can have a thickness of 0.1 inch to 4 inches, 0.1 inch to 3 inches, 0.1 inch to 2 inches, or 0.125 inch to 1 inch.

Building materials comprising the substrates are described herein. In some embodiments, the building material can include a fabric material; a substrate having a first surface and a second surface opposite the first surface, wherein the first surface is in contact with the first fabric material; and a cementitious material adjacent the first fabric material opposite the substrate.

The fabric material can be a fiber mat including inorganic fibers and/or organic fibers. The fabric material can include any of the fiber materials as described herein and can include a blend of different fibers (either type or size). In some embodiments, the fabric material can include glass fibers. In some embodiments, the fibrous glass is a low alkalinity fiber such as an E-glass fiber. The fabric material can be woven or non-woven. In some embodiments, the fabric material can be present in the form of individual fibers, chopped fibers, bundles, strings such as yarns, fabrics, scrims, papers, rovings, mats, or tows. Suitable examples of fabric materials include fiber mat such as a glass veil or a glass scrim.

The fibers in the fabric material can have an average diameter of 100 microns or less. For example, the fibers in the fabric material can have an average diameter of 1 μm or greater, 2 μm or greater, 3 μm or greater, 4 μm or greater, 5 μm or greater, 10 μm or greater, 15 μm or greater, 20 μm or greater, 25 μm or greater, 30 μm or greater, 40 μm or greater, 50 μm or greater, 60 μm or greater, 70 μm or greater, 80 μm or greater, 90 μm or greater, or 100 μm or greater. In some embodiments, the fibers in the fabric material can have an average diameter of 90 μm or less, 80 μm or less, 70 μm or less, 60 μm or less, 50 μm or less, 40 μm or less, 30 μm or less, 25 μm or less, or 20 μm or less. In certain embodiments, the fibers in the fabric material can have an average diameter of from 1 μm to 100 μm, 1 μm to 70 μm, 1 μm to 50 μm, 1 μm to 25 μm, 5 μm to 100 μm, 5 μm to 50 μm, 5 μm to 25 μm, or 5 μm to 20 μm.

The thickness of the fabric material on the substrate can be any suitable thickness to reinforce the substrate. In some embodiments, the average thickness of the fabric material can be 0.1 inch or less. For example, the fabric material can have an average thickness of 0.07 inch or less, 0.05 inch or less, 0.03 inch or less, 0.01 inch or less, 0.005 inch or less, or 0.001 inch or less. In some embodiments, the fabric material can have an average thickness of 0.001 inch or greater, 0.005 inch or greater, 0.01 inch or greater, 0.03 inch or greater, 0.05 inch or greater, or 0.07 inch or greater. In some embodiments, the fabric material can have an average thickness of from 0.001 inch to 0.1 inch or from 0.001 inch to 0.05 inch.

The fabric material can have a basis weight of 50 g/ft$^2$ or less. In some embodiments, the fabric material can have a basis weight of 40 g/ft$^2$ or less, 30 g/ft$^2$ or less, 20 g/ft$^2$ or less, 17 g/ft$^2$ or less, 15 g/ft$^2$ or less, 12 g/ft$^2$ or less, 10 g/ft$^2$ or less, 9 g/ft$^2$ or less, 8 g/ft$^2$ or less, 7 g/ft$^2$ or less, 6 g/ft$^2$ or less, or 5 g/ft$^2$ or less. In some embodiments, the fabric material can have a basis weight of 0.5 g/ft$^2$ or greater, 1 g/ft$^2$ or greater, 2 g/ft$^2$ or greater, 3 g/ft$^2$ or greater, 4 g/ft$^2$ or greater, 5 g/ft$^2$ or greater, 7 g/ft$^2$ or greater, 10 g/ft$^2$ or greater, 15 g/ft$^2$ or greater, or 20 g/ft$^2$ or greater. In some embodiments, the fabric material can have a basis weight of from 0.5 g/ft$^2$ to 50 g/ft$^2$, from 0.5 g/ft$^2$ to 25 g/ft$^2$, from 0.5 g/ft$^2$ to 20 g/ft$^2$, from 1 g/ft$^2$ to 10 g/ft$^2$, or from 1.5 g/ft$^2$ to 10 g/ft$^2$.

As described herein, the building material can include a coating. The coating can be any suitable material the can bond the fabric material to the first surface of the substrate. In some embodiments, the coating can include a polymeric material. Examples of polymeric materials suitable for forming the coating are described herein.

In some embodiments, the coating can include a cementitious material. In some embodiments, the cementitious material can form a layer adjacent the first fabric material, opposite the substrate. The cementitious material can include any suitable material for forming a cementitious layer with the desirable properties. In some embodiments, the cementitious material includes a rapid set cement. The rapid set cement can include calcium aluminate cement (CAC), calcium phosphate cement, calcium sulfate hydrate, calcium sulfoaluminate (CSA) cement, magnesium oxychloride cement, magnesium oxysulfate cement, magnesium phosphate cement, or combinations thereof. In some embodiments, the cementitious material can include Portland cement. The rapid set cement and/or the Portland cement can be present in an amount of 50% or greater by weight, e.g., 60% or greater, 70% or greater, 80% or greater, or 90% or greater by weight, based on the total weight of the cementitious material. In some embodiments, the cementitious material does not include gypsum (calcium sulfate hydrate).

In some embodiments, the cementitious material can include an inorganic polymer formed by reacting a reactive powder and an activator in the presence of water. Suitable inorganic polymers are described in U.S. Patent Publication No. 2014/0349104, which is herein incorporated by reference. The reactive powder for use in the cementitious material can include fly ash. In some examples, the majority of the fly ash present is Class C fly ash (i.e., greater than 50% of the fly ash present is Class C fly ash).

The fly ash is the principal component of the reactive powder and can be present in an amount of greater than 50% by weight, 65% by weight or greater, 75% by weight or greater, or 85% by weight or greater of the reactive powder. In some examples, the fly ash is present in an amount of 90% by weight or greater of the reactive powder or 95% by weight or greater of the reactive powder. For example, the fly ash can be present in an amount of 85% by weight or greater, 86% by weight or greater, 87% by weight or greater, 88% by weight or greater, 89% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight or greater based on the weight of the reactive powder. In some embodiments, the reactive powder consists of or consists essentially of fly ash.

The reactive powder for use as a reactant to form the inorganic polymer compositions can further include other cementitious components. In some embodiments, the reactive powder can include a rapid set cement as described herein. In some embodiments, the reactive powder can include Portland cement. In some embodiments, the reactive powder further includes slag. In some embodiments, the reactive powder further includes sand. In some embodiments, the reactive powder includes Portland cement, calcium aluminate cement, calcium sulfoaluminate cement, and/or slag. In these examples, the reactive powder can include 10% or less by weight of the other cementitious material. In some examples, the reactive powder includes 5% by weight or less, 3% by weight or less, or 1% by weight or less of other cementitious material. For example, the reactive powder can include the other cementitious material cement in an amount of 10% or less by weight, 9% or less by weight, 8% or less by weight, 7% or less by weight, 6% or less by weight, 5% or less by weight, 4% or less by weight, 3% or less by weight, 2% or less by weight, 1% or less by weight, or 0.5% or less by weight. In some examples, the reactive powder is substantially free from other cementitious material. For example, the reactive powder can include less than 0.1% by weight, less than 0.01% by weight, or less than 0.001% by weight of Portland cement based on the weight of the reactive powder. In some embodiments, the reactive powder includes no Portland cement.

The reactive powder can also include a ground slag such as blast furnace slag in an amount of 10% or less by weight. For example, the reactive powder can include slag in an amount of 10% or less, 9% or less, 8% or less, 7% or less, 6% or less, 5% or less, 4% or less, 3% or less, 2% or less, or 1% or less by weight.

An activator is a further reactant used to form the inorganic polymer compositions described herein. The activator allows for rapid setting of the inorganic polymer compositions and also imparts compressive strength to the compositions. The activator can include one or more of acidic, basic, and/or salt components. For example, the activator can include citrates, hydroxides, metasilicates, carbonates, aluminates, sulfates, and/or tartrates. The activator can also include other multifunctional acids that are capable of complexing or chelating calcium ions (e.g., EDTA). Specific examples of suitable citrates for use as activators include citric acid and its salts, including, for example, sodium citrate and potassium citrate. Specific examples of suitable tartrates include tartaric acid and its salts (e.g., sodium tartrate and potassium tartrate). In some examples, the activator can include alkali metal hydroxides, such as sodium hydroxide and potassium hydroxide. Further examples of suitable activators include metasilicates (e.g., sodium metasilicate and potassium metasilicate); carbonates (e.g., sodium carbonate and potassium carbonate); aluminates (e.g., sodium aluminate and potassium aluminate); and sulfates (e.g., sodium sulfate and potassium sulfate). In some examples, the activator includes citric acid, tartaric acid, or mixtures thereof. In some examples, the activator includes sodium hydroxide. In some examples, the activator includes a mixture of citric acid and sodium hydroxide. In examples including a mixture of citric acid and sodium hydroxide, the weight ratio of citric acid present in the mixture to sodium hydroxide present in the mixture is from 0.4:1 to 2.0:1, 0.6:1 to 1.9:1, 0.8:1 to 1.8:1, 0.9:1 to 1.7:1, or 1.0:1 to 1.6:1. The activator components can be pre-mixed prior to being added to the other reactive components in the inorganic polymer or added separately to the other reactive components. For example, citric acid and sodium hydroxide could be combined to produce sodium citrate and the mixture can include possibly one or more of citric acid and sodium hydroxide in stoichiometric excess. In some embodiments, the activator includes a stoichiometric excess of sodium hydroxide. The total amount of activators can include less than 95% by weight of citrate salts. For example, the total amount of activator can include from 25-85%, 30-75%, or 35-65% citrate salts by weight. The mixture in solution and the mixture when combined with the reactive powder can have a pH of from 12 to 13.5 or about 13.

The activator can be present as a reactant in an amount of from 1.5% to 8.5% dry weight based on the weight of the reactive powder. For example, the activator can be present in an amount of from 2% to 8%, from 3% to 7%, or from 4% to 6%. In some examples, the activator can be present in an amount of 1.5%, 2%, 2.5%, 3%, 3.5%, 4%, 4.5%, 5%, 5.5%, 6%, 6.5%, 7%, 7.5%, 8% or 8.5% dry weight based on the weight of the reactive powder. For example, when sodium hydroxide and citric acid are used as the activators, the amount of sodium hydroxide used in the activator solution can be from 0.3 to 15.6, 0.5 to 10, 0.75 to 7.5, or 1 to 5 dry parts by weight based on the weight of reactive powder and the amount of citric acid used in the activator solution can be from 0.25 to 8.5, 0.5 to 0.7, 0.75 to 0.6, or 1 to 4.5 dry parts by weight based on the weight of reactive powder. The resulting activator solution can include sodium citrate and optionally one or more of citric acid or sodium hydroxide.

The activator can be provided, for example, as a solution. In some examples, the activator can be provided in water as an aqueous solution in a concentration of from 10% to 50% or from 20% to 40% based on the weight of the solution. For example, the concentration of the activator in the aqueous solution can be from 25% to 35% or from 28% to 32% based on the weight of the solution. Examples of suitable concentrations for the activator in the aqueous solution include 10%, 15%, 20%, 25%, 30%, 35%, 40%, 45%, or 50% based on the weight of the solution.

The inorganic polymer compositions described herein can be prepared in the presence of aerating agents, including blowing agents and foaming agents. Examples of suitable blowing agents include aluminum powder, perborates (e.g., sodium perborate), peroxides (e.g., $H_2O_2$ or an organic peroxide), and chloride dioxide. The blowing agent can be present in an amount of from 0.1% to 10% by weight of the reactive powder. The aerating agents described herein can also include foaming agents. In some examples, the foaming agent can be an air-entraining agent. Foaming agents can be used to help the system maintain air or other gases, e.g., from the mixing process. The foaming agents can include non-ionic surfactants, anion surfactants, and/or cationic surfactants. Examples of suitable foaming agents include sodium alkyl ether sulfate, ammonium alkyl ether sulfate, sodium alpha olefin sulfonate, sodium deceth sulfate, ammonium deceth sulfate, sodium laureth sulfate, and sodium dodecylbenzene sulfonate. The foaming agents can be provided in an amount of 0.1% or less based on the weight of the reactive powder. In some examples, the foaming agents can be included in the compositions in an amount of from 0.001% by weight to 0.1% by weight or from 0.005% by weight to 0.05% by weight (e.g., 0.01% by weight).

The reactants to form the inorganic polymer compositions can be reacted in the presence of water. The water can be provided in the reactive mixture by providing the activator in solution and/or by adding water directly to the reactive mixture. The solution to binder or solution to reactive powder weight ratio (i.e., the ratio of the solution including activator to reactive powder) can be from 0.09:1 to 0.5:1, depending on the product being made and the process being used for producing the product.

The reactants used to form the inorganic polymer compositions can further include a retardant. Retardants are optionally included to prevent the composition from stiffening too rapidly, which can result in a reduction of strength in the structure. Examples of suitable retardants for inclusion as reactants include borax, boric acid, gypsum, phosphates, gluconates, or a mixture of these. In some examples, the retardant is present in an amount of from 0.4% to 7.5% based on the weight of the reactive powder.

The coating (for example the cementitious material) used in the building materials can include a filler, such as those described herein. In some examples, when the coating is a cementitious material, the coating can include a rapid set cement, Portland cement, and a filler such as fly ash, slag, sand, or combinations thereof. In some embodiments, the cementitious material can include a rapid set cement and a filler such as fly ash, slag, or sand. In some examples, the cementitious material can include Portland cement and a filler. In some examples, the cementitious material consists or consists essentially of a rapid set cement, a filler in an amount of 30% or less by weight (e.g., 25% or less by weight, or 20% or less by weight), based on the total weight of the cementitious material, and optionally Portland cement. In some examples, the filler (e.g., fly ash, slag, sand, or combinations thereof) can be present in an amount of from 5% to 30% by weight, based on the total weight of the coating (such as the cementitious material). In some examples, the filler can include a lightweight filler.

In some embodiments, a coating can include a fiber material, e.g., to provide increased strength, stiffness or toughness. In some examples, fire resistant or retardant glass fibers can be included to impart fire resistance or retarding properties to the coating. Suitable fiber materials useful with the coating are described herein. The fibers can be included in an amount of 0.1% to 6% based on the weight of the coating.

Additional components useful with the coatings (for example the cementitious material) described herein include air entraining agents, water reducers, plasticizers, pigments, anti-efflorescence agents, ultraviolet light stabilizers, retardants including fire retardants, antimicrobials, and antioxidants. Air entraining agents can be used to entrain air in the coating thereby reducing the density of the coating. Water reducers can be included in the coating described herein to reduce the amount of water in the coating while maintaining the workability, fluidity, and/or plasticity of the coating. In some examples, the water reducer is a high-range water reducer, such as, for example, a superplasticizer admixture. Examples of suitable water reducers include lignin, naphthalene, melamine, polycarboxylates, lignosulfates and formaldehyde condensates (e.g., sodium naphthalene sulfonate formaldehyde condensate). Water reducers can be provided in an amount of from greater than 0 to 1% by weight based on the weight of the coating.

The coating can further include a photocatalyst. Photocatalysts are optionally included for the reduction of nitrogen oxides (NOx) and self-cleaning. In some embodiments, the coating can include titanium dioxide. Example of suitable photocatalyst includes titanium dioxide. In some embodiments, the photocatalyst can be dispersed within the coating. In some embodiments, the photocatalyst can be present as a coating on the coating. In some examples, the titanium dioxide can be provided as a coating on the coating and is present in an amount of from 1% to 10% based on the weight of the coating on the coating.

The coating can be any suitable thickness to confer a desirable property to the building material, e.g., to provide increased strength, handleability, stiffness or toughness. In some embodiments, the thickness of the coating can be 0.5 inch or less. For example, the coating can have an average thickness of 0.4 inch or less, 0.3 inch or less, 0.25 inch or less, 0.20 inch or less, or 0.15 inch or less. In some embodiments, the coating can have an average thickness of 0.005 inch or greater, 0.01 inch or greater, 0.05 inch or greater, or 0.1 inch or greater. In some embodiments, the coating can have an average thickness of from 0.005 inch to 0.25 inch or from 0.005 inch to 0.20 inch.

In some embodiments, the fabric material (such as the fiber mat), the coating (such as the cementitious material), and/or the filler (such as fly ash) can be coated with a composition to modify their reactivity. For example, the fabric material, the coating, and/or the filler can be coated with a sizing agent such as a coupling agent (compatibilizer). In some embodiments, the fabric material, the coating, and/or the filler can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al. and U.S. Pat. No. 6,602,379 to Li et al. describe suitable aminosilane compounds for coating fibers. In some embodiments, the fabric material, the coating, and/or the filler are surface coated with a composition comprising a silane compound such as aminosilane. In some embodiments, the fabric material, the coating, and/or the filler are surface coated with a composition comprising an oil, starch, or a combination thereof.

As described herein, the building material can include a first fabric material on a first surface of the substrate and a second fabric material on a second surface, opposite the first surface, of the substrate. In some embodiments, the building material can include a first fabric material on a first surface of the substrate and a facing material, other than a fabric material, on a second surface of the substrate. In some embodiments, the facing material can include a cementitious layer, a paper sheet, a metal sheet, a polymeric layer, or a combination thereof. Suitable materials that can be included on the second surface of the substrate include an aluminum sheet, an aluminum-plated sheet, a zinc sheet, a zinc-plated sheet, an aluminum/zinc alloy sheet, an aluminum/zinc alloy-plated sheet, a stainless steel sheet, kraft paper, a polymeric surfacing film, or a combination thereof.

Methods

Methods of preparing the building materials are described herein. As described herein, the building materials can include a substrate comprising a fabric material in contact with a first surface of the substrate and a coating material adjacent the fabric material opposite the substrate. The substrate can comprise a polymeric material.

The polymeric substrate can be produced by mixing a polymer and a filler in a mixing apparatus such as a high speed mixer or an extruder. In some embodiments, mixing can be conducted in an extruder. The materials can be added in any suitable order. The substrate can be produced using a batch, semi-batch, or continuous process. The method can include applying shear to the mixture to disperse the filler in the mixture. As discussed herein, in some embodiments, the polymer is a polyurethane formed by a reaction of at least one isocyanate and at least one polyol, optionally in the presence of a catalyst. Thus, in some embodiments, the method can include forming a polyurethane mixture. The polyurethane mixture can be produced by mixing one or more isocyanates, one or more polyols, and the filler in a mixing apparatus. For example, in some embodiments, the mixing stage of the method used to prepare the foam can include: (1) mixing the polyol and filler; (2) mixing the isocyanate with the polyol, and filler; and optionally (3) mixing the catalyst with the isocyanate, the polyol, and the filler.

An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of building materials described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as blowing agents, surfactants, and catalysts.

The curing stage of the method used to prepare the substrate can be carried out in a mold cavity of a mold, the mold cavity formed by at least an interior mold surface. Thus, the method can include extruding the mixture into a mold cavity. The mold can be a continuous forming system such as a belt molding system or can include individual batch molds. The belt molding system can include a mold cavity formed at least in part by opposing surfaces of two opposed belts. In some embodiments, a molded article can then be formed prior to the additional method steps in forming the building material.

The polymer may be processed at an elevated temperature (e.g., 200-500° F.) to form a melt and to allow the polymer to have a workable viscosity. In some embodiments, the filler is heated before mixing with the polymer. The molten filled polymer (that is, the polymer, the inorganic filler, and the short length fibers) can have a workable viscosity of 5 Pa·s to 250 Pa·s. Incorporation of a filler into the polymer mixture can increase the viscosity of the mixture. However, in the polyurethane foams, the one or more polyols, one or more isocyanates, or a mixture thereof, and the filler can be included in amounts, which results in a decrease in the viscosity of the polyurethane mixture, and thus improves the processability of such materials and products. In some embodiments, it is desirable that the composite mixture has a viscosity below a particular threshold at the desired loadings so it can be effectively processed. In some embodiments, the ingredients in the substrate can be present in amounts to produce a workable viscosity (initial viscosity) of from 5 Pa·s to 250 Pa·s. In some embodiments, the working viscosity can be less than 250 Pa·s, less than 225 Pa·s, less than 200 Pa·s, less than 175 Pa·s, less than 150 Pa·s, less than 100 Pa·s, less than 80 Pa·s, less than 60 Pa·s, less than 50 Pa·s, less than 40 Pa·s, less than 30 Pa·s, less than 20 Pa·s, less than 15 Pa·s, or less than 10 Pa·s. For example, the mixture can have a workable viscosity from 5 Pa·s to 200 Pa·s, 5 Pass to 150 Pa·s, 5 Pass to 100 Pa·s, 20 Pa·s to 200 Pa·s, 20 Pa·s to 150 Pa·s, 20 Pa·s to 100 Pa·s, 50 Pa·s to 250 Pa·s, 65 Pa·s to 250 Pa·s, or 80 Pa·s to 250 Pa·s. The viscosity of the composite mixture can be measured using a Brookfield Viscometer.

The polyurethane or polyisocyanurate mixture can be applied to the mold using a nozzle traversing the mold. In some embodiments, the one or more polyols, one or more isocyanates, or a mixture thereof, and the filler can be included in amounts, which result in a workable viscosity (initial viscosity) of 100,000 cPs or less for the polyurethane or polyisocyanurate mixture, and thus improves the processability of such materials and products. In some embodiments, the mixture can be applied to the mold at a viscosity of from 5,000 to 100,000 cPs or from 20,000 to 100,000 cPs at the temperature of the mixture. The viscosity of the composite mixture can be measured using a Brookfield Viscometer.

In some embodiments, the polyurethane or polyisocyanurate mixture can be foamed. The method of making the polyurethane or polyisocyanurate foams can include allowing the mixture to expand via a gas phase to form a foam having a first surface and a second surface opposite the first surface. The gas phase can be generated in situ from reaction of water with the one or more isocyanates. The gas can be introduced into the polyurethane mixture. Suitable gases are known in the art. In some embodiments, the gas can be captured after gelation (i.e., formation) of the foam.

The foaming action of the polyurethane or polyisocyanurate foams can be described as having a "cream time," during which foaming is initiated and the mixture reaches a consistency of a soft creamy foam, a "firm time" at which the foam sets up and hardens, and a "tack free time" at which time surface no longer feels sticky. The cream time of the polyisocyanurate or polyurethane can be 20 seconds or longer, 40 seconds or longer, 60 seconds or longer, or 80 seconds or longer. For example, the cream time of the polyisocyanurate or polyurethane can be from 20 seconds to 120 seconds, from 40 seconds to 120 seconds, from 60 seconds to 120 seconds or from 80 seconds to 120 seconds. The tack free time of the polyisocyanurate or polyurethane can be 90 seconds or longer, 2 minutes or longer, 3 minutes or longer, 4 minutes or longer, or 5 minutes or longer and/or 7 minutes or less, 6 minutes or less, 5 minutes or less, or 4 minutes or less. For example, the tack free time of the polyisocyanurate or polyurethane can be from 90 seconds to 7 minutes, from 2 minutes to 7 minutes or from 3 minutes to 6 minutes. In some embodiments, the polyisocyanurate or polyurethane foam reaches a hardness of 20 shore D at no less than 5 minutes. For example, the polyisocyanurate or polyurethane foam does not reach a hardness of 20 shore D in less than 5 minutes. For example, the polyurethane foam does not reach a hardness of 20 shore D in less than 7.5 minutes, less than 10 minutes, less than 12.5 minutes, less than 15 minutes, less than 17.5 minutes, or less than 20 minutes. The Shore D hardness can be determined using a durometer as described in ASTM D2240.

In some cases, the mixture can be allowed to rise freely during foaming in the mold. After the polyurethane or polyisocyanurate foam is formed, the method can include removing the foam stock from the mold. As described herein, the mold can be a flexible, disposable container. In some embodiments, the method can include cutting through the container to remove the foam stock from the mold.

The methods for making the building material can include applying a first fabric material to a surface of the substrate. In some embodiments, the fabric material can be applied to the substrate before it has completely cured, such that at least a portion of the fabric material becomes embedded in the substrate. For example, the fabric material can be applied to the substrate mixture after the mixture is fed to the mold. In some embodiments, the fabric material can be applied to the mold prior to the mixture being fed into the mold and can become embedded prior to the full curing of the mixture. In some embodiments, the fabric material can be applied to the substrate after the substrate has been cured. For example, an adhesive can be applied to bond the fabric material to the substrate. The adhesive can be applied by spray coating, curtain coating, brushing, roller coating, dip coating, spin coating, or flow coating. Suitable adhesives include an adhesive derived from ethylene vinyl acetate, acrylic, urethane, epoxy, starch, gum, resin (such as gum arabic, gum tragacanth, rubber or shellac), or combinations thereof.

The method can further include applying a hydrophobic polymeric woven mesh to the fabric material. Without wishing to be bound by theory, the addition of the hydrophobic polymeric woven mesh to the fabric material can stabilize the fabric material during subsequent processing steps. For example, the fabric material can be agitated, through layering, vibration, stirring, or mixing during application of the coating to the building material. The hydrophobic polymeric woven mesh may also serve to improve the surface finish of the coating. In some embodiments, the hydrophobic polymeric woven mesh can contribute to a controlled and uniform thickness of the coating. In some embodiments, the method can include affixing the hydrophobic polymeric woven mesh to the fabric material and the substrate. The hydrophobic polymeric woven mesh can be mechanically affixed to the fabric material and the substrate using screw, pin, nail, tack, staple, and the like.

The hydrophobic polymeric woven mesh is of a nature such that the coating can penetrate the mesh and the fabric material, but yet is chemically resistant to the coating material and/or substrate mixture. In some embodiments, the hydrophobic polymeric woven mesh can be derived from a hydrophobic polymer selected from a polyolefin, a polyarylalkylene, derivatives thereof, copolymers thereof, and blends thereof. In some examples, the hydrophobic polymeric woven mesh can be derived from polyethylene, polypropylene, polyisobutylene, polymethylbutene, polymethylpentene, polyisoprene, polybutadiene, polystyrene, polytetrafluoroethylene, a derivative thereof, a copolymer thereof, and a blend thereof. In some embodiments, the hydrophobic polymeric woven mesh can have mesh openings having lengths and widths from 1/32 inch to 1/2 inch, for example, from 1/16 inch to 1/4 inch.

The method can further include applying a coating to the hydrophobic polymeric woven mesh thereby allowing the coating to penetrate the hydrophobic polymeric woven mesh and fabric material. As described herein, the coating can include a cementitious material. The coating such as the cementitious material can be in the form of a slurry. In some examples, the coating can be applied at a viscosity of from 25 to 5000 cPs or from 30 to 3000 cPs at 25° C. In some embodiments, the coating is non-self-leveling. The slurry can be applied by roller coating, curtain coating, dip coating, brushing, with a trowel, or spraying. In some embodiments, the application of the coating material can be vacuum assisted.

In some embodiments, where the coating includes a cementitious material, the method can include applying a liquid to a surface of the foam to activate the cementitious slurry. In certain embodiments, the liquid can be an aqueous solution having a pH of 5 or greater or 6.5 or greater. The liquid optionally includes an activator. Suitable activators are described herein.

After application of the coating material, the method can include removing the hydrophobic polymeric woven mesh, prior to curing the coating. The method can further include curing the coating material thereby bonding the fabric material to the first surface of the substrate.

The method for making the building material can further include applying a material to the coating to retain moisture in the coating during curing. The material can include a plastic material, a paper material such as kraft paper or wax impregnated kraft paper, or a plywood sheet. In some embodiments, the method can include reversing the coated surface to retain moisture in the coating while a coating is applied on the other side of the reinforced substrate.

As described herein, the method can include applying a facing material to the second surface of the substrate. In some embodiments, the second surface of the substrate can be treated the same as the first surface of the substrate. For example, the method can include applying a fabric material to the second surface of the substrate, applying a hydrophobic polymeric woven mesh to the fabric material, applying a coating to the hydrophobic polymeric woven mesh thereby allowing the coating to penetrate the hydrophobic polymeric woven mesh and fabric material, removing the hydrophobic polymeric woven mesh, and curing the coating thereby bonding the fabric material to the second surface of the substrate.

In some embodiments, the method can include applying an adhesive to the second surface of the substrate prior to applying a facing material. The method can further include applying a facing material to the adhesive thereby bonding the material to the second surface of the substrate. The adhesive can be applied by spray coating, curtain coating, brushing, roller coating, dip coating, spin coating, or flow coating. Suitable adhesives are described herein.

In some embodiments, the coating, the fabric material, and the substrate are directly adhered without the use of an adhesive layer. For example, where the substrate is a polyurethane foam including a particulate filler (such as fly ash) and the coating includes a cementitious material, the method can include allowing the particulate filler to react with the cementitious material to form a chemical bond between the cementitious material and the substrate. In embodiments wherein the cementitious slurry and the fabric material are directly bonded to a fly ash-filled foam, it has been discovered that the cementitious slurry forms mechanical bonds with the fly ash present in the foam thereby enhancing the bonding of the cementitious slurry and the fabric material to the foam.

Incorporation of the fabric material and/or the coating (such as a cementitious material) onto the substrate can maintain similar or improved physical properties and mechanical performance such as flexural strength, hardness, stiffness, flame resistance, and handleability of such materials, when the fabric material and/or the coating is excluded from or included in minor amounts in the substrate. The optimization of various properties of the building materials, such as hardness, stiffness, flexural strength, handleability, and flame resistance of the substrate allows their use in building materials and other structural applications. For example, the building materials can be formed into shaped articles and used in building materials. Suitable building materials include building panels, tile backer board, sheathing, roofing products, siding materials, sheets, sound barrier/insulation, thermal barriers, insulation, decking materials, fencing materials, cladding, or other shaped articles. Examples of shaped articles made using the building materials described herein include roof tiles such as roof tile shingles, roof cover boards, slate panels, shake panels, cast molded products, moldings, sills, stone, masonry, brick products, posts, signs, guard rails, retaining walls, park benches, tables, slats, corner arches, columns, wall boards, ceiling tiles, ceiling boards, soffits, or railroad ties.

In some embodiments, incorporation of the fabric material on the substrate to form the building materials can increase the flexural strength of the substrate, compared to a substrate without the fabric material. In some embodiments, the flexural strength of the substrate can be increased by at least 10%, for example, 15% or greater, 20% or greater, 25% or greater, 30% or greater, 35% or greater, 50% or greater, 75% or greater, or even 100% or greater, compared to a substrate without the fabric material. The flexural strength of the building materials described herein can be 200 psi or greater (e.g., up to 1600 psi). For example, the flexural strength of the building materials can be 300 psi or greater, 500 psi or greater, 700 psi or greater, 900 psi or greater, 1000 psi or greater, 1100 psi or greater, 1200 psi or greater, 1300 psi or greater, 1400 psi or greater, or 1500 psi or greater. The flexural strength can be determined by the load required to fracture a rectangular prism loaded in the three point bend test as described in ASTM C1185-08 (2012).

In some embodiments, incorporation of the fabric material and the coating (such as a cementitious material) on the substrate can increase the hardness of the building material, compared to a building material without the fabric material and the coating. In some embodiments, the Shore D hardness of the building materials described herein can be 50 or greater (e.g., up to 90). For example, the Shore D hardness of the building materials can be 55 or greater, 60 or greater, 65 or greater, 75 or greater, or 80 or greater. The Shore D hardness can be determined using a durometer as described in ASTM D2240.

In some embodiments, incorporation of the fabric material and the coating (such as a cementitious material) on the substrate can increase the stiffness of the building material, compared to a building material without the fabric material and the coating. In some embodiments, the modulus of elasticity (stiffness) of the building material can be 10 ksi or greater, 50 ksi or greater or 100 ksi or greater. For example, the modulus of elasticity can be from 10 to 500 ksi or from 50 to 500 ksi. The modulus of elasticity can be determined as described in ASTM C947-03.

In some embodiments, incorporation of the fabric material and the coating (such as a cementitious material) on the substrate can increase the flame resistance of the building material, compared to a building material without the fabric material and the coating. In some embodiments, the building materials can be qualified as a Class A material in the ASTM E84 tunnel test. In some embodiments, the building materials have a flame spread rating of 25 or less and a smoke development rating of 450 or less. The flame spread and smoke development ratings can be determined as described in the ASTM E84 test.

Examples

Preparation of polyurethane foams: Polyurethane foams were prepared using three different polyols labeled as Polyol A, a petroleum-derived polypropylene based polyol having a hydroxyl number of 240 mg KOH/g, a functionality of 3, and a viscosity of 250 mPa·s; Polyol B, a glycerin initiated polyether polyol having a hydroxyl number of 240 mg KOH/g, a functionality of 3, and a viscosity of 250 mPa·s at 25° C.; and Polyol C, a sucrose/amine initiated polyether polyol having a hydroxyl number of 350 mg KOH/g, a functionality of 5.5, and a viscosity of 2,500 mPa·s at 25° C.

The composites were prepared by wetting fly ash (in an amount of about 75% by weight of the foam) and chopped fiber glass (about 3% by weight of the foam) in an extruder with concurrent streams of polyol (about 12% by weight of the foam) and methylene diphenyl diisocyanate (about 12% by weight of the foam) and a catalyst (about 0.2 part per hundred of polyol) and simultaneously stirring. The mixture was extruded into a cardboard box and allowed to cure.

Preparation of substrates and coating with glass mesh and cement coating: Two substrates with nominal dimension ½" thickness, with area approximately 0.75 to 1.5 sq ft were cut from the cured mixture. The density of the substrates was about 24.6 pcf. One of the substrates was covered with a 10 mil thick glass mesh and coated with a rapid set cement slurry to a total thickness of about 0.022 inch. The other substrate was taken as the control. The sample with cement coating was cured and the physical properties determined.

TABLE 1

Mechanical properties of polyurethane foam.

| Formulation | Density, pcf | Average Thickness, in | Flexural Strength, psi | Modulus, ksi | Handleability, in * lbs.in |
|---|---|---|---|---|---|
| Sample 1 - Control substrate | 24.6 | 0.508 | 500 | 63 | 9.7 |
| Sample 1 including rapid set cement with 10 mil glass fiber mesh | 31.3 | 0.530 | 783 | 153 | 12.8 |

Summary: The physical properties of the composites, including flexural strength, density, handleability, and modulus were determined. The handleability is a measure of the ability of the material to be flexed during use and is calculated as 0.5×breaking load×ultimate deflection/thickness of the test specimen. The extension is a measure of the deflection of a sample during the three point bend test as defined in ASTM C947-03. The modulus is calculated from the stress/strain curve of the three point bend test. Normalized flexural strength is the ratio of flexural strength divided by the density. The use of the glass fiber mesh and rapid set cement improved the mechanical properties. The density also increased due to the addition of the glass mesh and cementitious coating.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, and constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A method of producing a building material, comprising:
providing a substrate having a first surface and an opposed second surface,
applying a fabric material to the first surface of the substrate;
applying a hydrophobic polymeric woven mesh to the fabric material;
applying a coating to the hydrophobic polymeric woven mesh thereby allowing the coating to penetrate the hydrophobic polymeric woven mesh and fabric material;
removing the hydrophobic polymeric woven mesh; and then
curing the coating thereby bonding the fabric material to the first surface of the substrate,
wherein the coating comprises a cementitious material selected from calcium aluminate cement, calcium phosphate cement, calcium sulfate hydrate, calcium sulfoaluminate cement, magnesium oxychloride cement, magnesium oxysulfate cement, magnesium phosphate cement, or combinations thereof.

2. The method of claim 1, wherein the substrate is a polymeric material.

3. The method of claim 2, wherein the substrate is a polyurethane foam.

4. The method of claim 3, wherein the substrate further comprises 50% or greater of an inorganic filler.

5. The method of claim 4, wherein the inorganic filler includes fly ash.

6. The method of claim 1, wherein the substrate has a density of from 5 lb/ft³ to 35 lb/ft³.

7. The method of claim 1, wherein the fabric material includes inorganic fibers selected from glass fibers, polyalkylene fibers, polyester fibers, polyamide fibers, phenolformaldehyde fibers, polyvinyl chloride fibers, polyacrylic fibers, acrylic polyester fibers, polyurethane fibers, polyacrylonitrile fibers, rayon fibers, cellulose fibers, carbon fibers, metal and metal-coated fibers, mineral fibers, or combinations thereof.

8. The method of claim 7, wherein the fabric material is a glass veil or a glass scrim.

9. The method of claim 1, wherein the fabric material has a basis weight of from 0.5 g/ft² to 50 g/ft².

10. The method of claim 1, wherein the hydrophobic polymeric woven mesh comprises a polyethylene woven mesh.

11. The method of claim 1, wherein the hydrophobic polymeric woven mesh and the fabric material are affixed to the substrate prior to applying the coating.

12. The method of claim 1, wherein the cementitious material is present in an amount of 50% or greater by weight, based on the total weight of the coating.

13. The method of claim 1, wherein the cementitious material further comprises fly ash, slag, sand, or combinations thereof.

14. The method of claim 1, wherein the cementitious material further comprises an inorganic polymer formed by reacting in the presence of water: a reactive powder comprising fly ash and an activator.

15. The method of claim 1, wherein the coating further comprises a polymeric material.

16. The method of claim 1, further comprising the steps of:
   applying a fabric material to the second surface of the substrate;
   applying a hydrophobic polymeric woven mesh to the fabric material;
   applying a coating to the hydrophobic polymeric woven mesh thereby allowing the coating to penetrate the hydrophobic polymeric woven mesh and fabric material;
   removing the hydrophobic polymeric woven mesh; and
   curing the coating thereby bonding the fabric material to the second surface of the substrate.

17. The method of claim 16, wherein a moisture-retaining material is contacted with the coating adjacent the first surface to retain moisture in the coating adjacent the first surface while the coating adjacent the second surface is applied.

18. The method of claim 17, wherein the moisture-retaining material is a plastic material, a paper material, or a plywood sheet.

19. The method of claim 1, further comprising the steps of:
   applying an adhesive to the second surface of the substrate; and
   applying a facing material to the adhesive thereby bonding the material to the second surface of the substrate.

20. The method of claim 19, wherein the facing material comprises a paper sheet, a metal sheet, or a polymeric film.

21. A method of producing a building product panel, comprising:
   providing a substrate comprising a polyurethane formed by (a) a reaction mixture comprising (i) one or more isocyanates selected from the group consisting of diisocyanates, polyisocyanates, and mixtures thereof, and (ii) one or more polyols; and (b) from greater than 50% to 90% by weight, based on the total weight of the substrate, of a particulate filler;
   applying a nonwoven or woven fiber mat to the substrate;
   applying a hydrophobic polymeric woven mesh to the nonwoven or woven fiber mat;
   applying a coating to the hydrophobic polymeric woven mesh thereby allowing the coating to penetrate the hydrophobic polymeric woven mesh and the nonwoven or woven fiber mat;
   removing the hydrophobic polymeric woven mesh; and then
   curing the coating thereby bonding the nonwoven or woven fiber mat to the substrate to form the building product panel,
   wherein the coating comprises a cementitious material selected from calcium aluminate cement, calcium phosphate cement, calcium sulfate hydrate, calcium sulfoaluminate cement, magnesium oxychloride cement, magnesium oxysulfate cement, magnesium phosphate cement, or combinations thereof.

22. The method of claim 21, wherein the cementitious material is present in an amount of 50% or greater by weight, based on the total weight of the coating.

* * * * *